United States Patent [19]

Ruhlman

[11] Patent Number: 5,167,166

[45] Date of Patent: Dec. 1, 1992

[54] RACK AND ROLLER CORE ELEMENT ADJUST

[75] Inventor: David L. Ruhlman, Macomb Township, Macomb County, Mich.

[73] Assignee: Teleflex Incorporated, Limerick, Pa.

[21] Appl. No.: 774,814

[22] Filed: Oct. 11, 1991

[51] Int. Cl.⁵ .................... F16C 1/22; G05G 5/16; G05G 5/18

[52] U.S. Cl. .................. 74/502.4; 74/502.6; 74/530; 74/531; 74/586; 403/104

[58] Field of Search .............. 74/502.4, 502.6, 530, 74/531, 586; 403/104, 109

[56] References Cited

U.S. PATENT DOCUMENTS

| | | | |
|---|---|---|---|
| 968,181 | 8/1910 | Moore | 74/586 |
| 3,174,742 | 3/1965 | Stelzer | 74/502.4 X |
| 3,572,159 | 3/1971 | Tschanz | 74/501 |
| 3,986,363 | 10/1976 | Beaman et al. | 74/502.4 X |
| 3,993,169 | 11/1976 | Baba | 403/104 X |
| 4,177,691 | 12/1979 | Fillmore | 74/501 |
| 4,360,283 | 11/1982 | Psotta | 403/104 |
| 4,586,341 | 5/1986 | Kobus | 74/502.4 X |
| 4,702,117 | 10/1987 | Tsutsumi et al. | 74/502.6 X |

Primary Examiner—Allan D. Herrmann
Attorney, Agent, or Firm—Reising, Ethington, Barnard, Perry & Milton

[57] ABSTRACT

A motion transmitting remote control assembly (10) of the type for transmitting motion along a curved path by a flexible motion transmitting core element (12) movably supported within a flexible conduit (14). The assembly (10) includes an adjustment member (18) for adjusting the length of the core element (12). The adjustment member (18) includes a housing (20) having a slot (26) therein and a further includes a rack (28) movably disposed in the slot (26). A lockable roller (40) having a periphery (42) tangentially in rolling engagement with the rack (28) interconnects the housing (20) and rack (28). A lock member (48) is movably engageable with the rack (28) or roller (40) for preventing movement therebetween thereby locking the roller (40) in a selected position along the rack (28) to maintain an adjusted core element (12) length.

14 Claims, 3 Drawing Sheets

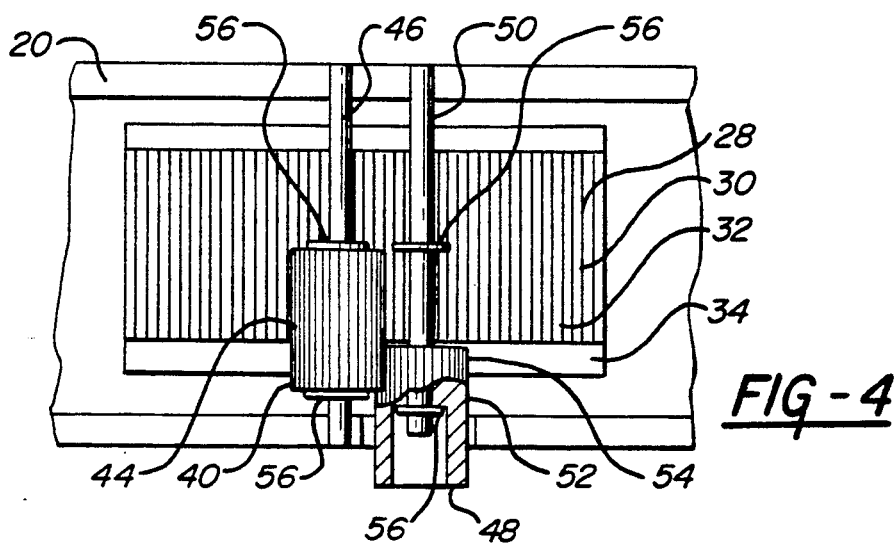
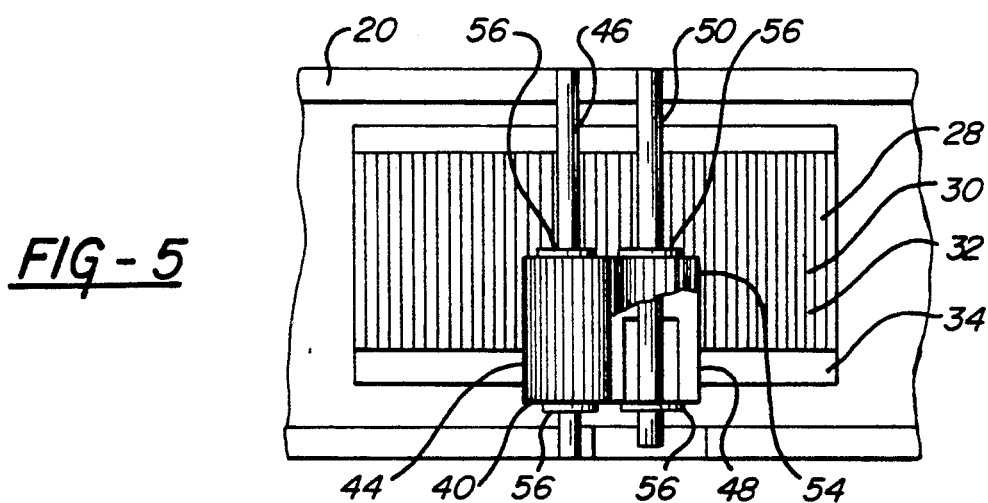
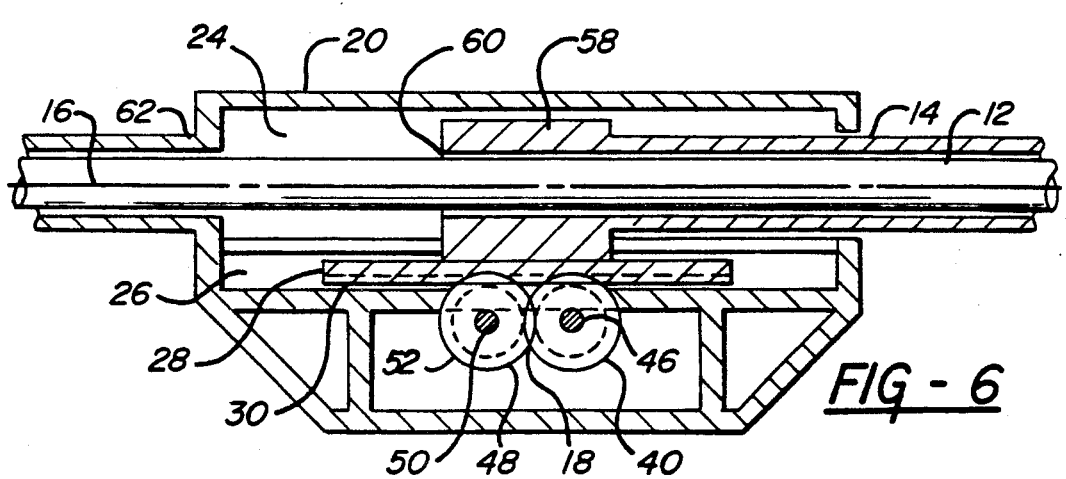

RACK AND ROLLER CORE ELEMENT ADJUST

BACKGROUND OF THE INVENTION

1. Technical Field

The subject invention relates to a motion transmitting remote control assembly of the type for transmitting motion along a curved path by a flexible motion transmitting core element movably supported within a flexible conduit. More specifically, the subject invention relates to an assembly including an adjustment member for adjusting the length of the core element or conduit.

2. Description of the Related Art

Remote control assemblies including an adjustment member for adjusting the position of a conduit or core element are well known in the art. Such remote control assemblies generally include a core element slidably disposed within a flexible conduit. The ends of the core element extend from the ends of the conduit and are adapted to interconnect a control member and an actuator for transmitting forces therebetween. It is frequently desirable to adjust the effective length of the core element or conduit between the control member and the actuator after the assembly has been interconnected therebetween. For example, during installation of such an assembly in a vehicle, the effective length of the core element between the control member and the actuator often needs adjustment due to variances in dimensional specifications of different vehicles. Accordingly, to effect such an adjustment, the core element must be routed along a more or less direct path, between the control member and the actuator, to lengthen or shorten its effective length therebetween. In order to make such an adjustment, assemblies include adjustment members. Typical adjustment members include three essential components; a first member secured to either the conduit or core element, a second member moveable relative to the first member and secured to either a control member, actuator, or fitting and a third member for selectively interlocking the first and second members together thereby preventing movement therebetween.

An assembly for accomplishing such an adjustment is shown in U.S. Pat. No. 4,177,691 in the name of Fillmore and assigned to the assignee of the subject invention. The Fillmore '691 patent discloses an assembly with an adjustment member including a first member secured to the end of the conduit with adjustment teeth disposed along the sides thereof. The first member extends through a passageway in a support member which is adapted for attachment to a support structure. A locking member, having locking teeth thereon, is movable between engaged and disengaged positions for selectively engaging the locking teeth with the adjustment teeth disposed on the first member thereby preventing movement between the first member and the support member.

U.S. Pat. No. 3,572,159 granted Mar. 23, 1971 at August E. Tschanz and assigned to the assignee of the subject invention, discloses an assembly similar to that just described. However, the Tschanz '159 assembly includes a locking member having a circular opening with threads therein for engaging a circular first member. Although this circular arrangement allows for relative rotation between the conduit and the second member, such rotation in fact changes the effective length of adjustment of the assembly. That is, by rotating the conduit relative to the second member, the circular first member actually "threads" or "screws" longitudinally through the circular threads of the locking member. Consequently, the rotation of the conduit is obtained at the expense of changing the adjustment of the conduit and core element. Additionally, when the locking member moves slightly from its fully engaged position, large portions of its circular threads become disengaged from the adjustment member, thereby decreasing the holding power of the locking member upon the adjustment member. Partial disengagement is particularly common in vehicular applications due to the jarring and vibration most assemblies are exposed to.

Due to the precision required in many motion transmitting remote control applications, highly accurate adjustments are often needed. Accordingly, in such applications it becomes necessary to utilize adjustment members capable of extremely fine adjustments. Unfortunately, prior art adjustment members are limited by the thickness of their adjustment teeth. That is, the incremental adjustment of the core element is limited by the thickness of the adjustment teeth. While thinner adjustment teeth permit finer adjustment, they also are weak and provide insufficient holding strength.

SUMMARY OF THE INVENTION

The subject invention is a motion transmitting remote control assembly of the type for transmitting motion along a curved path by a flexible motion transmitting core element. The assembly comprises; a conduit, a motion transmitting core element slidably disposed within the conduit and extending along a longitudinal axis and adjustment means for adjusting the length of one of the conduit and the core element. The adjustment means includes a rack having an axially extending engagement surface. The assembly is characterized by a lockable roller having a periphery tangentially in rolling engagement with the engagement surface of the rack and locking means for locking the roller in a selected position axially along the engaging surface to maintain an adjusted length of one of the conduit and core element.

An advantage of utilizing such a rack and roller arrangement is realized by adjustment means capable of extremely fine adjustments in the length of the core element while maintaining sufficient holding strength.

BRIEF DESCRIPTION OF THE DRAWINGS

Other advantages of the subject invention will be readily appreciated as the same becomes better understood by reference to the following detailed description when considered in connection with the accompanying drawings wherein:

FIG. 4 is a cross-sectional top view substantially similar to FIG. 3 illustrating the pinion gear and roller intermeshed with the rack and each other;

FIG. 5 is a cross-sectional side view of the subject invention;

FIG. 6 is a cross-sectional side view of an alternative embodiment of the subject invention;

DETAILED DESCRIPTION OF THE PREFERRED EMBODIMENT

Figure 1:
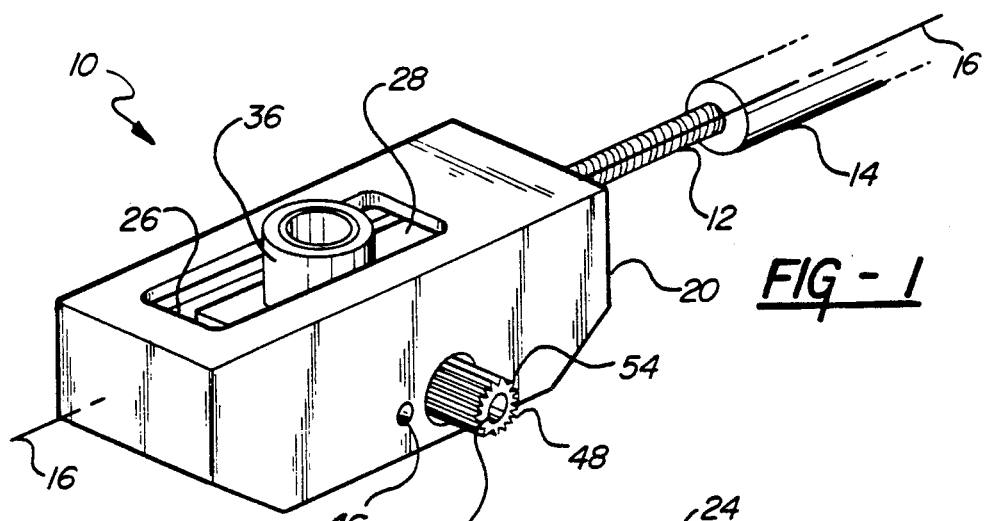
FIG. 1 is a perspective view of the subject invention.

Referring now to the Figures wherein like numerals indicate like or corresponding parts throughout the several views, a motion transmitting remote control assembly of the type for transmitting motion along a curved path between an actuator (not shown) and a control member (not shown) is generally shown at 10. Motion is transmitted between the actuator and control member by a flexible motion transmitting core element 12 supported and guided by a conduit 14 disposed about a portion thereof and extending along a longitudinal axis 16. The assembly 10 includes adjustment means 18 for adjusting the length of one of the conduit 14 and the core element 12 between the actuator and the control member. In other words, the adjustment means 18 permits the positions of the actuator and control member to be adjusted relative to one another by allowing the core element 12 to be routed along a more or less direct path, between the control member and the actuator, to lengthen or shorten its effective length therebetween.

Figure 2:
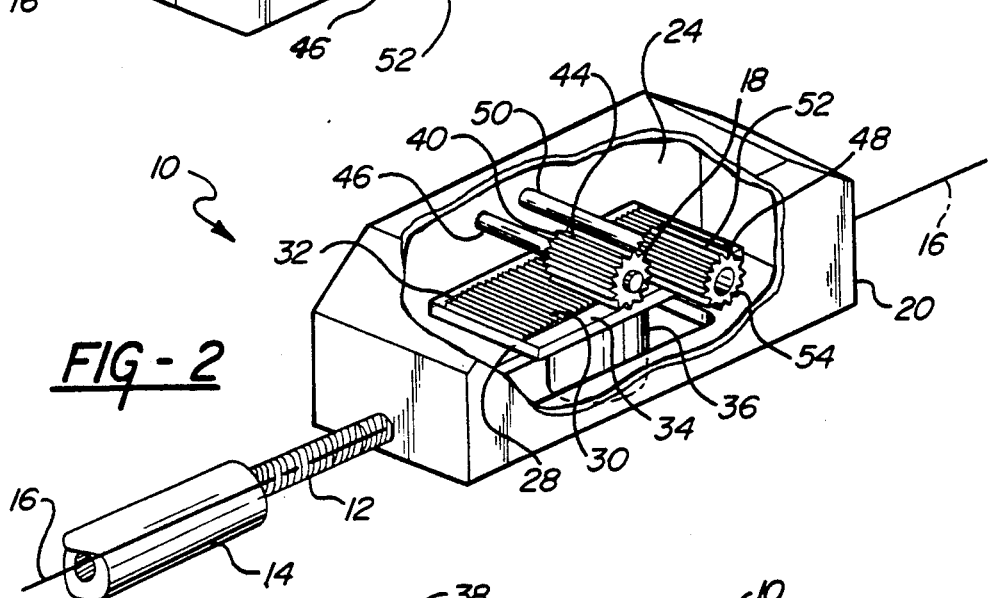
FIG. 2 is a perspective view partially broken away illustrating the rack, roller, and pinion gear.

Turning to FIG. 2, the adjustment means 18 is shown including a housing 20. The housing 20 is secured to an end 22 of the core element 12 (best shown in FIG. 3) in any manner commonly known in the art. For example, the housing 20 may be molded about the core element 12 or the end 22 of the core element 12 may include a slug member disposed thereon for fitting within a corresponding groove in the housing 20.

The housing 20 includes a cavity 24 therein and a slot 26 disposed along one side providing access to the cavity. A rack 28 is slidably disposed within the slot 26 and is movable therealong. The rack 28 includes an axially extending rectangular engagement surface 30 having gear teeth 32 disposed along the length thereof. A smooth portion 34 is also disposed along the engagement surface 30 and preferably boarders the gear teeth 32 along the length of the engagement surface 30. A coupling 36 extends from the rack 28 in a direction opposite the gear teeth 32 and out from the cavity 24 through the slot 26. The coupling 36 is adapted to interconnect with a fitting 38 (shown in phantom in FIG. 3) extending from control member, support member or actuator.

A lockable roller 40 is provided and has its periphery 42 tangentially in rolling engagement with the engagement surface 30 of the rack 28. As shown in FIG. 2, the periphery 42 of the roller 40 includes gear teeth 44 disposed thereon so that the gear teeth 44 of the roller 40 intermesh with the gear teeth 32 disposed along the engagement surface 30 of the rack 28. The roller 40 is rotatably mounted about a first axle 46 so that the roller 40 freely rotates about the first axle 46 as the rack 28 is axially moved axially along the slot 26. The ends of the first axle 46 are firmly secured to the housing 20 so that the roller 40 remains rigidly supported as it rotates about the first axle 46.

A lock means is provided for locking the roller 40 in a selected position axially along the engagement surface 30 of the rack 28 to maintain an adjusted length of either the conduit 14 or core element 12. More specifically, the lock means includes a lock member 48 engageable with the rack 28, roller 40 or both for preventing movement between the rack 28 and roller 40. Turning to FIGS. 4 and 5, the lock means is shown including a second axle 50 positioned parallel and spaced from the first axle 46. A pinion gear 52 having gear teeth 54 disposed therearound is rotatably mounted about the second axle 50 and is moveable therealong between a first and second position for selectively engaging the gear teeth 32 of the rack 28. More specifically, the first position, shown in FIG. 4, corresponds to the pinion gear 52 intermeshing with the gear teeth 44 on the roller 40 while simultaneously being positioned adjacent the smooth portion 34 of the engagement surface 30 of the rack 28. Thus, the pinion gear 52 freely rotates about the second axle 50 as the roller 40 simultaneously rotates about the first axle 46 and as the rack 28 is moved axially along the slot 26. That is, as the rack 28 is moved along the slot 26 in the housing 20, the gear teeth 32 of the rack 28 intermesh with the gear teeth 44 on the roller 40 thereby causing the roller 40 to rotate about the first axle 46. Rotation of the roller 40 corresponding rotates the pinion gear 52 because of their intermeshing relationship. The pinion gear 52 does not intermesh with the gear teeth 32 on the engagement surface 30 but rather rotates adjacent the smooth portion 34 thereof. Thus, the rack 28 is permitted to slide along the slot 26 allowing the housing 20 to move relative thereto and permitting the length of the core element 12 to be adjusted.

FIG. 5 illustrates the pinion gear 52 in the second position wherein the pinion gear 52 is in an axially raised position and intermeshing with the gear teeth 32 on the rack 28. In the second position, the pinion gear 52 simultaneously intermeshes with the gear teeth 32 disposed on the rack 28 and the gear teeth 44 on the roller 40 thereby interlocking the rack 28, roller 40 and pinion gear 52 and preventing movement therebetween. That is, with the pinion gear 52 intermeshed simultaneously with both the gear teeth of the rack 28 and the roller 40, all of the members 28, 40, 52 effectively lock up until the pinion gear 52 is moved to the first position, out of engagement with the gear teeth 32 on the rack 28. Thus, the relative positions of the core element 12 (secured to the housing 20) and a control member (secured to the rack 28) remain fixed.

As will be appreciated by those skilled in the art, the pinion gear 52 may be urged between the first and second positions in a number of different ways. For example, a spring (not shown) may bias the pinion gear 52 out of the second position and into the first position. With such an arrangement, the pinion gear 52 may be manually forced from the first position to the second position and retained in the second position by a retainer, such as a clip. Obviously, many other arrangements commonly known in the art could also be used.

Retaining means 56 are included for maintaining the axial position of the roller 40 and pinion gear 52 relative to the first 46 and second 50 axles and may comprise "cir clips" as shown in FIGS. 4 and 5. It will be appreciated by those skilled in the art that various means, other than "cir clips", may be employed for maintaining the roller 40 and pinion gear 52 in their axial positions. For example, notched areas (not shown) may be provided in the first 46 and second 50 axle for receiving projections (not shown) extending from the roller 40 and pinion gear 52.

Although the roller 40 has been described in constant intermeshing engagement with the pinion gear 52, the pinion gear 52 may be movable out of engagement with the roller 40. Likewise, although the roller 40 has been described in constant intermeshing engagement with the rack 28, the roller 40 may be movable along the first axle 46 out of engagement with the rack 28.

FIG. 6 discloses an alternative embodiment of the subject assembly 10 comprising essentially the same components as previously described. Like numerals are used in FIG. 6 to denote like or corresponding parts previously described. The alternative embodiment is distinguished from that previously described by directly adjusting the length of the conduit 14 rather than the core element 12, thereby changing the effective length of the core element 12 between the control member and actuator by changing the path of the core element 12 therebetween.

Turning to FIG. 6, the subject invention is generally shown at 10 including a housing 20 with a cavity 24 and a slot 26 therein. A rack 28 is included having a base 58 with a tunnel 60 therethrough. The rack 28 is slidably disposed in a slot 26 so that it is movable relative to the housing 20. A roller 40 is also included and is identical to the roller previously described. Unlike the previously described embodiment however, the conduit 14 is secured to the rack 28. The core element 12 passes through the housing 20 and through the tunnel 60 of the base 58 and is not directly secured to the assembly 10. A second conduit 62 is preferably secured to the housing 20 as shown in FIG. 6.

Figure 3:
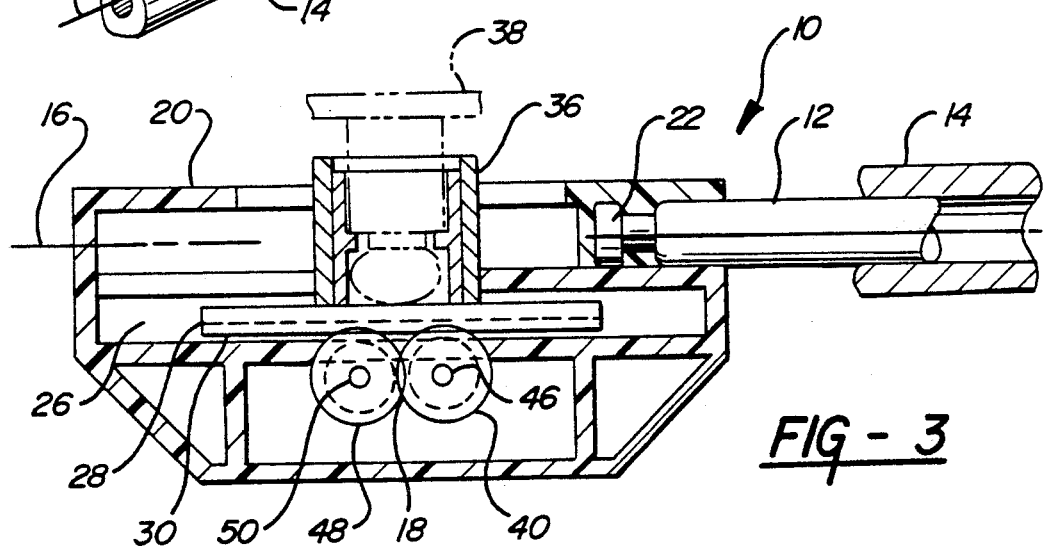
FIG. 3 is a cross-sectional top view illustrating the roller, pinion gear and rack wherein the roller is intermeshed with the gear teeth on the rack and the pinion gear, shown partially broken away, is positioned adjacent the smooth portion of the rack.

Adjustments in the length of the conduit 14 are made in an identical fashion as previously described with regard to the core element 12. In summary, a pinion gear 52 is moveable between first and second positions in exactly the same manner as previously described and illustrated in FIGS. 3 and 4. That is, by moving the pinion gear 52 into the second position (as described above and shown in FIG. 4) the rack 28 is prevented from moving relative to the housing 20. Whereas, when the pinion gear 52 is in the first position (as shown in FIG. 3) the rack 28 is permitted to slide along the slot 26 permitting the housing 20 and rack 28 to move relative to one another. In this manner, the length of the conduit 14 may be adjusted by changing the position of the rack 28 relative to the housing 20. By changing the length of the conduit 14, the path the core element 12 traverses between the actuator and the control member is shortened or lengthened thereby adjusting the effective length of the core element 12 between the control member and the actuator.

Although FIG. 6 illustrates an embodiment of the subject invention wherein the assembly 10 is not rigidly secured to a support structure, it is to be understood that the assembly 10 may be easily modified to be secured to a support member. With such an arrangement, a coupling may be positioned on the rack 28 (in the same manner as shown in FIG. 3) to secure the assembly 10 to a fitting of a support structure. The second conduit 62 may not be necessary.

Figure 7:
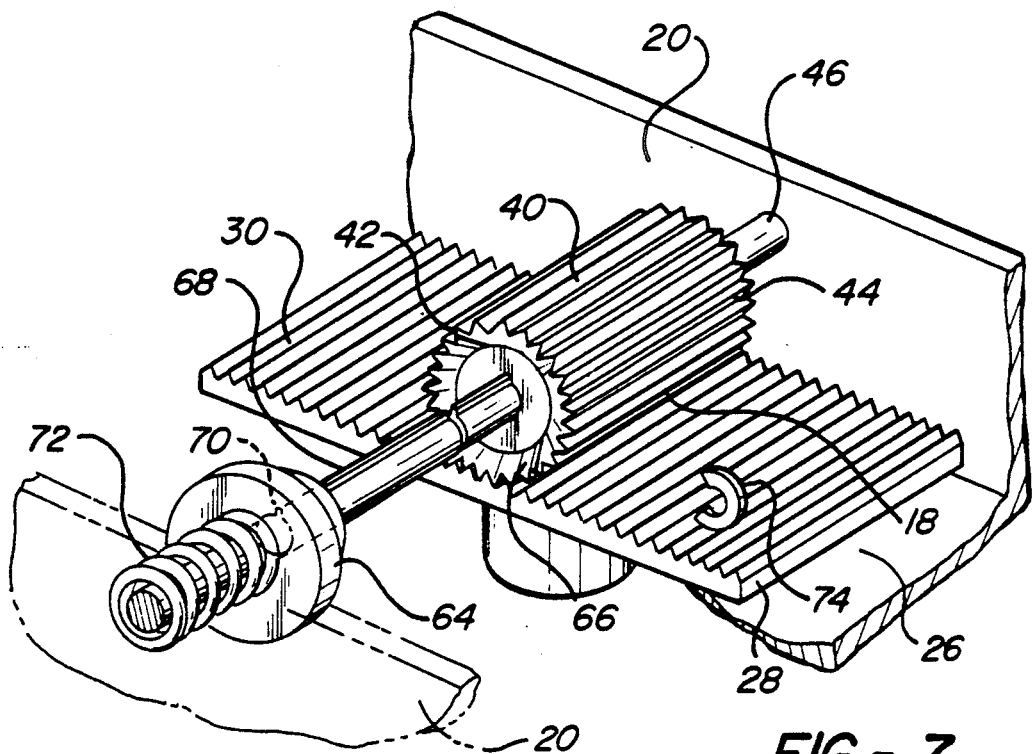
FIG. 7 is a perspective view of another alternative embodiment of the subject invention showing a clutch member engageable with the roller.

FIG. 7 discloses an alternative embodiment of the subject assembly 10. Like the previously described embodiments, the alternative embodiment of FIG. 7 includes substantially the same parts and like numerals have been used to denote like parts. As shown in FIG. 7, the alternative embodiment includes an axle 46 secured to a housing 20 at each end. A roller 40 is rotatably mounted about the axle 46 and is preferably not slidable along the axle 46. A rack 28 is provided and is movable disposed within a slot 26 as previously described. A periphery 42 of the roller 40 is in tangentially rolling engagement with the rack 28. More specifically, the outer periphery 42 of the roller 40 engages the rack 28 so that as the rack 28 as moved along the slot 26, the roller 40 rotates about the first axle 46. Gear teeth are preferable disposed about the roller 40 and rack and preferably intermesh with one another. Although the use of gear teeth on the rack 28 and roller 40 are preferred, they are not required. In other words, the rack 28 and roller 40 need not have gear teeth but rather may fictionally engage one another.

In distinction from the previously described embodiments, FIG. 7 shows a lock means including a brake member 64 non-rotatable secured about the axle 46 and movable therealong for engaging with an end 66 of the roller 40 to prevent the roller 40 from rotating about the axle 46. Preferably a ridge 68 is provided along a portion of the axle 46, as shown in FIG. 7, for engaging a corresponding groove 70 in the brake member 64 to prevent the brake member 64 from rotating about the axle 46. It will be appreciated by those skilled in the art that numerous, well known means may be used in substitution for the ridge/groove configuration shown. A spring 72 may be disposed about the axle 46 in order to bias the clutch 64 into frictional engagement with the end 66 of the roller 40. Additionally, a lock member 74 such as a "cir clip" may be used to lock the clutch 64 in place.

Although not shown in FIG. 7, clutch members 64 may be positioned on both ends of the roller. That is, brake members 64 may be mounted about each end of the axle 46 so as to fictionally engage each end of the roller 40 thereby enhancing locking strength between the rack 28 and roller 40.

Figure 8:
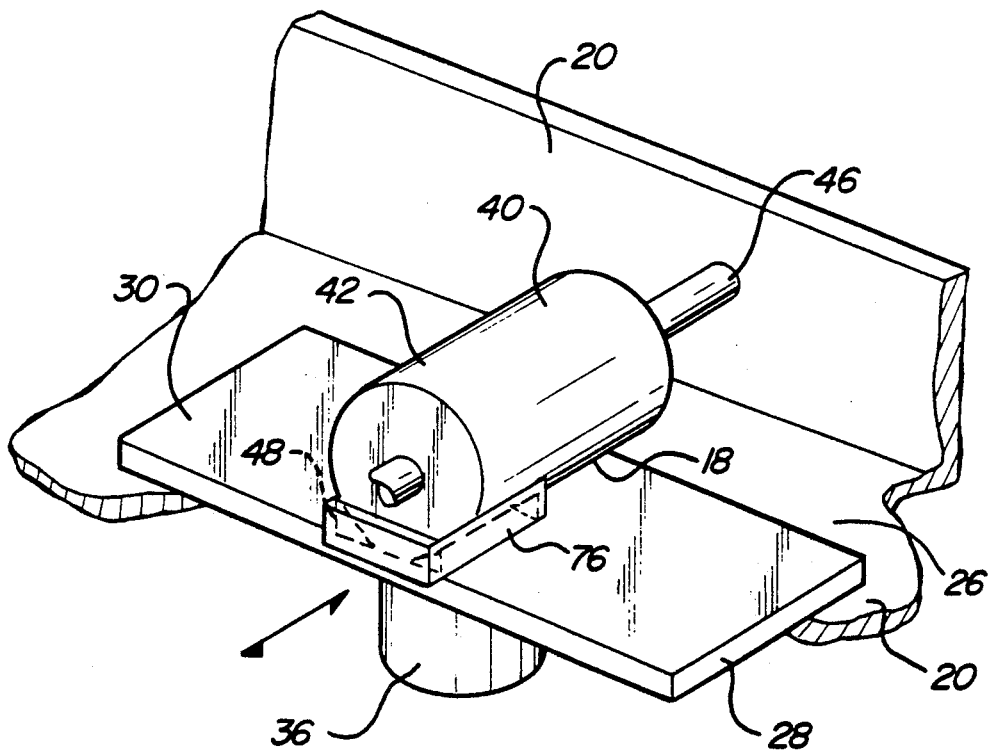
FIG. 8 is a perspective view of still another alternative embodiment of the subject invention showing a wedge engageable with both the rack and roller.

FIG. 8 shows yet another alternative embodiment of the subject invention. As before, like numerals have been used to denote like parts previously described. Turning to FIG. 8, a portion of a housing 20 is shown including a portion of a slot 26. A rack 28, similar to that previously described, is disposed in the rack 28 and is slidable therein. The rack 28 includes an engagement surface 30 and a coupling 36 as previously described. An axle 46 is secured to the housing 20 and includes a roller 40 rotatably mounted thereon. An outer periphery 42 of the roller 40 tangentially engages the engagement surface 30 of the rack 28 so that the roller 40 rotates about the axle 46 as the rack 28 is moved along the slot 26. In a similar fashion as previously described, the length of the core element 12 may be adjusted so as to change the relative positions of an actuator and control member secured to the ends of the core element 12. In other words, the rack 28 may be moved to a select position relative to the housing 20 so that the core element 12 is adjusted to the proper length. Once the rack 28 is positioned within the selected position a lock member 48, more particularly a wedge 76 is moved into simultaneous engagement with the rack 28 and roller 40 so as to prevent movement therebetween. Accordingly, the length of the core element 12 may be fixed at a selected position and may be adjusted by removing the wedge 76 from engagement with the rack 28 and roller 40. As shown, the wedge 76 preferably engages the rack 28 and roller 40 to prevent movement in either axial direction i.e. both forward and rearward.

It will be appreciated the embodiments of FIGS. 7 and 8 allow the roller 40 to be positioned at any position along the rack 28. Accordingly, the core element 12 or conduit 14 may be adjusted in extremely fine increments thus, allowing for increased adjustment sensitivity.

The invention has been described in an illustrative manner and it is to be understood that the terminology which has been used is intended to be in the nature of words of description rather than limitation.

Obviously, many modifications and variations of the instant invention are possible in light of the above teachings. It is therefore, to be understood that within the scope of the appended claims, the invention may be practiced otherwise than as specifically described.

What is claimed:

1. A motion transmitting remote control assembly of the type for transmitting motion along a curved path by a flexible motion transmitting core element, said assembly comprising:
   a conduit (14);
   a motion transmitting core element (12) slidably disposed within said conduit (14) and extending along a longitudinal axis (16);
   adjustment means (18) for adjusting the length of one of said conduit (14) and said core element (12);
   said adjustment means (18) including a rack (28) having an axially extending engagement surface (30);
   a lockable roller (40) having a periphery (42) tangentially in rolling engagement with said engagement surface (30) of said rack (28); locking means (48) for locking said roller (40) in a selected position axially along said engagement surface (30) to maintain an adjusted length of one of said conduit (14) and core element (12) and characterized by said locking means (48) simultaneously engageable with said rack (28) and roller (40) for preventing movement therebetween.

2. An assembly as set forth in claim 1 further characterized by said roller (40) rotatably mounted about a first axle (46).

3. An assembly as set forth in claim 2 further characterized by a housing (20) secured to said first axle (46) and supporting said roller (40).

4. An assembly as set forth in claim 3 further characterized by said housing (20) including a slot (26), said rack (28) disposed in said slot (26) and movable therealong.

5. An assembly as set forth in claim 4 further characterized by said roller (40) having gear teeth (44) disposed thereabout.

6. An assembly as set forth in claim 5 wherein said rack (28) includes gear teeth (32) disposed along a portion of said engagement surface (30) and further characterized by said gear teeth (32) of said rack (28) in meshing engagement with said gear teeth (44) on said roller (40).

7. An assembly as set forth in claim 6 further characterized said locking means (48) including a second axle (50) positioned parallel and spaced from said first axle (46).

8. An assembly as set forth in claim 7 further characterized by said locking means (48) including a pinion gear (52) rotatably mounted about said second axle (50) and moveable therealong between a first and second position for selectively engaging said rack (28) and roller (40).

9. An assembly as set forth in claim 8 further characterized by said gear teeth (44) of said roller (40) intermeshing with said gear teeth (32) on said rack (28) so that said roller (40) rotates about said first axle (46) when said rack (28) is moved relative to said roller (40).

10. An assembly as set forth in claim 9 further characterized by said engagement surface (30) of said rack (28) including a smooth portion (34) extending axially therealong.

11. An assembly as set forth in claim 10 further characterized by said first position corresponding to said pinion gear (52) intermeshing with said gear teeth (54) on said roller (40) and adjacent said smooth portion (34) of said rack (28) thereby rotating about said second axle (50) and allowing relative movement between said rack (28) and roller (40).

12. An assembly as set forth in claim 11 further characterized by said second position corresponding to said pinion gear (52) intermeshing with said gear teeth (32, 44) disposed on said rack (28) and roller (40) thereby interlocking said rack (28) and roller (40) and preventing movement therebetween.

13. An assembly as set forth in claim 1 further characterized by said locking means (48) comprising a wedge (76) movable into engagement with said rack (28) and roller (40).

14. A motion transmitting remote control assembly of the type for transmitting motion along a curved path by a flexible motion transmitting core element, said assembly comprising:
   a conduit (14);
   a motion transmitting core element (12) slidably disposed within said conduit (14) and extending along a longitudinal axis (16);
   adjustment means (18) for adjusting the length of one of said conduit (14) and said core element (12);
   said adjustment means (18) including a rack (28) having an axially extending engagement surface (30);
   a lockable roller (40) having a periphery (42) tangentially in rolling engagement with said engagement surface (30) of said rack (28);
   locking means (48) for locking said roller (40) in a selected position axially along said engagement surface (30) to maintain an adjusted length of one of said conduit (14) and core element (12);
   said roller (40) rotatably mounted about a first axle (46); and
   characterized by said locking means (48) including a brake member (64) non-rotatably secured about said first axle (46) and movable therealong for engaging with said roller (40) to prevent said roller (40) from rotating about said first axle (46).

* * * * *